(12) United States Patent
Perratone

(10) Patent No.: US 10,295,096 B2
(45) Date of Patent: May 21, 2019

(54) ROTATING JOINT COMPRISING PRESSURISED SEALING RINGS

(71) Applicant: O.S.C. OFFSHORE SYSTEMS CONCEPTS, Aubagne (FR)

(72) Inventor: René Perratone, Menton (FR)

(73) Assignee: O.S.C. OFFSHORE SYSTEMS CONCEPTS, Aubagne (FR)

( * ) Notice: Subject to any disclaimer, the term of this patent is extended or adjusted under 35 U.S.C. 154(b) by 343 days.

(21) Appl. No.: 15/116,614

(22) PCT Filed: Feb. 4, 2015

(86) PCT No.: PCT/FR2015/050271
§ 371 (c)(1),
(2) Date: Aug. 4, 2016

(87) PCT Pub. No.: WO2015/118265
PCT Pub. Date: Aug. 13, 2015

(65) Prior Publication Data
US 2016/0348818 A1    Dec. 1, 2016

(30) Foreign Application Priority Data

Feb. 4, 2014    (FR) ..................... 14 50868

(51) Int. Cl.
*F16L 17/00* (2006.01)
*F16L 27/08* (2006.01)
(Continued)

(52) U.S. Cl.
CPC .......... *F16L 27/0824* (2013.01); *E21B 17/05* (2013.01); *F16L 17/10* (2013.01);
(Continued)

(58) Field of Classification Search
CPC ....... F16L 27/0824; F16L 17/10; F16L 39/04; E21B 17/05; Y10S 277/914; Y10S 277/927
(Continued)

(56) References Cited

U.S. PATENT DOCUMENTS 4,647,077 A * 3/1987 Ethridge ................. F16L 39/06
285/98
5,169,181 A  12/1992 Timm et al.
(Continued)

FOREIGN PATENT DOCUMENTS

GB    1 312 199 A    4/1973

OTHER PUBLICATIONS

International Search Report (PCT/ISA/210) dated Jun. 22, 2015, by the European Patent Office as the International Searching Authority for International Application No. PCT/FR2015/050271.
(Continued)

*Primary Examiner* — Greg Binda
(74) *Attorney, Agent, or Firm* — Buchanan Ingersoll & Rooney PC

(57) ABSTRACT

The invention relates to a rotating joint for transferring a first fluid, comprising a male member and a female member which are mounted movably in relation to each other and concentric, and one or more annular seals accommodated inside cavities arranged in the female member and optionally pressurized by means of an insulation fluid. The invention also relates to a fluid transfer system comprising one or more rotating joints according to the invention.

4 Claims, 4 Drawing Sheets

(51) Int. Cl.
*F16L 17/10* (2006.01)
*F16L 39/04* (2006.01)
*E21B 17/05* (2006.01)

(52) U.S. Cl.
CPC ........... *F16L 39/04* (2013.01); *Y10S 277/914* (2013.01); *Y10S 277/927* (2013.01)

(58) Field of Classification Search
USPC .......... 285/96, 98, 106, 110, 147.1; 277/558
See application file for complete search history.

(56) References Cited

U.S. PATENT DOCUMENTS 6,161,834 A     12/2000  Pollack et al.
6,581,976 B1 *  6/2003   Pollack ................. F16L 27/087
                                              285/106

OTHER PUBLICATIONS

Written Opinion (PCT/ISA/237) dated Jun. 22, 2015, by the European Patent Office as the International Searching Authority for International Application No. PCT/FR2015/050271.

* cited by examiner

ROTATING JOINT COMPRISING PRESSURISED SEALING RINGS

TECHNICAL FIELD

This invention relates to the field of rotating joints. Also called rotary connectors, these are used in all types of applications and preferably but not limited to the field of offshore rigs.

BACKGROUND DISCUSSION

An oil rig is a unit that enables the exploitation of hydrocarbon fields at sea, in other words the extraction, production or storage of oil and/or other gases such as, by way of non-limiting example, hydrocarbons, said products being located offshore sometimes at very great depths.

There are two types of rigs for the exploitation of offshore hydrocarbon and/or gas deposits:
- firstly, fixed rigs that rest on the seabed and can thus be rigidly connected to oil wellheads and subsea pipelines;
- then, Floating Production, Storage and Offloading units (hereinafter referred to as FPSO).

By way of a preferred but non-limiting example, a rotating joint will be considered in its application within an FPSO unit.

Such a floating unit generally takes the form of a ship moored to the seabed by a fixed or disconnectable system that enables, depending on environmental conditions, the rotation of floating supports about a central mooring point, in principle a mooring turret.

Various devices are present on said floating supports that make it possible:
- to process the hydrocarbons coming from a subsea reservoir and to separate the oil from the other components such as, by way of non-limiting examples, gas, water and sand;
- to store oil and/or other gases in advance so as to be able, subsequently, to export them using shuttle tankers;
- to re-inject into the reservoir the water and/or gas extracted from the oil and/or other gases that cannot be stored on the rig;
- to inject into the oil wellheads chemical products used to protect the said wellheads against corrosion and the formation of various by-products capable of disrupting the operation of said wells;
- to control the subsea installations by means of hydraulic and/or electrical commands.

The mooring turret is connected to the floating support by a bearing system, said bearing system allowing the vessel to rotate about the fixed geostatic part of the turret, said turret being attached to the anchoring system. A turret can advantageously be located internally or externally with respect to the vessel, its position depending chiefly on the structure of the hull and the number of flexible lines connected to the turret.

Furthermore, on the fixed part of the mooring system, a fluid transfer system allows the connection of subsea pipelines to the floating production unit. In fact, inside the turret, a rotating joint or an assembly of rotating joints (also known as a swivel joint or a swivel stack) allows a transfer of fluid to be made between the geostatic part and the free part of the vessel that rotates about the turret.

The rotating joints thus ensure that all of the fluids, be they gaseous or liquid, are safely transferred from the geostatic parts such as, by way of non-limiting examples, oil wells, pipelines submerged beneath the seabed, manifolds and hoses to the system enabling these movements. There are two main types of rotating joints:
- pipe-swivel also known as "in-line swivel joints"
- toroidal-swivel joints.

Pipe-swivel joints are the simplest fluid transfer systems. They contain a single fluid passage. When more than one fluid passage is required, toroidal-swivel joints are used: due to their large diameter, it is possible to provide a large number of fluid passages by stacking and/or assembling several toroidal-swivel joints together.

An example of a "conventional" toroidal-swivel joint comprises a certain number of main components. It comprises a male member, also called an "internal member," and a female member, also called an "external member," movable in relation to each other and kept concentric and coaxial with the aid of a mechanical bearing, by way of a non-limiting example a bearing with three rollers (also known as a 3-race roller bearing). In principle, the mechanical bearing enables the positioning, transmission of stress and rotation between the male and female members by replacing sliding with a bearing. In fact, the power absorbed by the resistance to rolling is much lower than the power absorbed by the resistance to sliding. The choice of a specific bearing is made on the basis of the dimensions and loads that the said bearing must withstand. A bearing usually comprises two rings, one internal and the other external, with integrated races. Rolling elements are arranged between the rings in the raceways. Rolling elements are, depending on circumstances, balls, cylindrical rollers, needles or tapered or spherical rollers. A cage usually guides the rolling elements, keeps them an equal distance apart and prevents them from coming into contact with each other. There are therefore four main types of bearings:
- ball bearings;
- tapered roller bearings;
- cylindrical roller bearings;
- needle bearings.

Usually, a 3-race bearing is used in rotating joints. This bearing has three rows of bearings to move in two directions: two rows of radial rollers and one row of axial rollers.

A toroidal chamber is formed between the male and female members, forming an enclosed space. It is through this chamber that the fluid is transferred. A plurality of chambers may be present within the same rotating joint in order to ensure the passage or transfer of one or more fluids.

In order to ensure sealing within a rotating joint, one or more seals can be arranged on each side of the toroidal chamber, enabling the formation of a narrow fluid passage. The seals are positioned respectively within grooves provided for this purpose. The grooves may advantageously but not necessarily result from toroidal cavities, made on the surface in the internal wall of one or other of the male and female members. The said cavities can be machined or obtained directly by molding the female or male member of the rotating joint. In principle, any type of sealing ring can be used to ensure sealing within a rotating joint. The sealing required is dynamic sealing since the male and female members rotate relative to each other. By way of non-limiting examples, the seals used can be: O-rings and U-shaped lip seals with one or more flexible lips. Furthermore, a seal is advantageously made of a material that is compatible with the transferred fluid or fluids to be sealed, resistant to anti-extrusion clearances. Advantageously but in no way limiting, the seal can be made of a synthetic elastomer such as polytetrafluoroethylene (PTFE) or silicones.

In particular, in the offshore field, the design of rotating joints is very often subject to high-pressure and high-temperature requirements. On occasion, the large size of the device can also have an impact on the design of a rotating joint. In current practice within the offshore field, two types of toroidal-swivel joints are usually used: the piston seal toroidal-swivel joint and the face seal toroidal-swivel joint. They will be described in relation to FIGS. 1 and 2.

FIG. 1 shows a first known embodiment of a toroidal-swivel joint, known as a piston seal swivel joint. This is the simplest and most conventional embodiment.

A rotating joint 11 comprises a male member 12 and a female member 13, kept concentric with the aid of a special mechanical bearing 16, a bearing that has three cylindrical rollers. The male 12 and female 13 members are movable in relation to each other. Said bearing 16, positioned above the male 12 and female 13 members, has numerous advantages: it has high resistance to shocks, it withstands very high radial loads and is suitable for high rotation frequencies. A toroidal chamber 15, to guarantee the transfer of a fluid, is formed between the male 12 and female 13 members, the fixed and rotating members respectively. In order to ensure the seal of the toroidal chamber 15, three seals 14a, 14b, and 14c are present: they are advantageously installed within grooves, more precisely cavities 7a, 7b and 7c made in the internal wall in the female member 13. As a variation, the cavities can be located in the male member 12. The cavities are made, advantageously but not in a limiting way, by machining with a machine tool using a boring or milling process or obtained by molding the female member 13. The seals 14a, 14b, and 14c are preferably, but not limited to, O-rings or U-shaped double lip seals. Said seals comprise a heel cooperating with two flexible lips. In this first particular embodiment, the lips of seal 14a, 14b, and 14c project parallel to the axis of revolution of the said seal. Seal 14a, 14b, and 14c guarantees sealing in the following manner: the two lips keep seal 14a, 14b, and 14c in contact with the cavity 7a, 7b and 7c which accommodates the said seal, defining the surface to be sealed, and thus ensure sealing. The lips follow the profile and shape of the cavity of the rotating joint 11. The heel enables the lips to cooperate and be held with the rest of the seal: the said heel and lips form a single entity. Sealing is ensured thanks to the lips, each lip maintaining contact on a surface 12a, 12b or 12c respectively of the fixed male member 12 and on a surface 13a, 13b or 13c of the rotating female member 13. Similarly, when the seal is an O-ring, sealing is ensured by the said O-ring on two contact surfaces: one 12a, 12b or 12c on the fixed male member 12 and the other 13a, 13b or 13c on the rotating female member 13.

Nevertheless, this configuration has a certain number of drawbacks. Over time, the seals, whatever their type, are subject to two classes of related deformations: extrusion and creep. Creep can be defined as a slow and delayed deformation of a body subject to a constant stress, caused by the period of application of this stress. In a rotating joint, the seals are subject to repeated movement, namely rotation, which corresponds to the said constant stress, and leads, over time, to a deformation of the said seals. In a standard assembly, the extrusion clearance of the seal increases with pressure and with the diameter of the seal. Furthermore, in the context of preventing the failure of the seal due to the extrusion phenomenon, the greater the pressure, the smaller the extrusion clearance permitted by the seal. Consequently, the implementation of this first embodiment is no longer appropriate when the pressure of the device and/or the diameter of the rotating joint increase. Moreover, sealing within the rotating joint is assured by the contact of each lip of the seal with one surface of the male and female members of the rotating joint. The two male and female members being in rotation relative to each other, the seal undergoes a shearing phenomenon, which could result in the seal failing to fulfill its role.

FIG. 2 shows a second known embodiment of a toroidal-swivel joint known as a face seal swivel joint.

As in the first embodiment described above, a rotating joint 21 comprises a male member 22 and a female member 23, kept concentric with the aid of a special mechanical bearing 26, a bearing that has three cylindrical rollers. The male 22 and female 23 members are movable in relation to each other. The said bearing 26, positioned above the male 22 and female 23 members, has numerous advantages: it has a high resistance to shocks, it withstands very high radial loads and is suitable for high rotation frequencies. A toroidal chamber 25 is formed between the male 22 and female 23 members, the rotating and fixed members respectively.

In order to ensure sealing of the toroidal chamber 25, three seals 24a, 24b and 24c are present: in this particular embodiment, as described above, the said seals 24a, 24b and 24c are advantageously positioned or installed within grooves, more precisely cavities 27a, 27b and 27c made in the female member 23. The cavities 27a, 27b and 27c are made, advantageously but not in a limiting way, by machining with a machine tool using a boring or milling process or obtained by molding the cavity directly in the female member 23. The female 23 and male 22 members, however, have a particular shape adapted to prevent any deformation of the seals 24a, 24b and 24c due to mechanical axial clearances. In fact, one or more annular protuberances are present on the male member 22. The said protuberance or protuberances are inserted in one or more grooves made in the female member 23 to accommodate the said male member. In order to accommodate seals 24a, 24b and 24c, cavities 27a, 27b and 27c are advantageously arranged on the internal wall of the female member within the space provided to accommodate the protuberance or protuberances. Furthermore, seals 24a, 24b and 24c are preferably, but not limited to, O-rings or U-shaped double lip seals, said seals comprising a heel cooperating with two flexible lips. In this second particular embodiment, the lips of the seal project in a plane normal to the axis of revolution of the said seal. The seal guarantees sealing in the following manner: the two lips keep the seal in contact with the cavity, defining the surface to be sealed, and thus ensure sealing. The lips follow the profile and shape of the cavity of the rotating joint 21. The heel enables the lips to cooperate and be held with the rest of the seal: the said heel and the lips form a single entity. Sealing is ensured thanks to the lips, each lip maintaining contact on a surface 22a, 22b or 22c, respectively, of the rotating male member and on a surface 23a, 23b or 23c of the fixed female member 23. Similarly, when the seal is an O-ring, sealing is ensured by the said O-ring on two contact surfaces: one 22a, 22b or 22c on the fixed male member 22 and the other 23a, 23b or 23c on the rotating female member 23.

This second embodiment enables a minimum variation of the extrusion clearance. It is consequently necessary to find a good equilibrium between the male and female members under pressure in order to limit the axial deformations of the seals. Consequently, the configuration of the seal requires a particular design, notably the presence of annular protuberances as described above, in order to ensure optimum equilibrium: this design consequently requires a high level of engineering and thus results in complex, and indeed sometimes problematic, manufacture and assembly. Furthermore, in this second embodiment, the extrusion and creep clearances are different in each seal. In fact, devices such as rotating joints have different mechanical tolerances depending on whether the seal is located at the top or bottom of the device. Variations in tolerances must be taken into account when designing the rotating joint, which often causes an increase in the costs of such a rotating joint. Consequently, a rotating joint according to the second embodiment is usually used for large diameters and under high pressure.

Furthermore, a rotating joint 21 according to the second embodiment is often associated with an oil barrier system. This system is based on the following principle: an oil barrier is artificially created between two or more seals in order to prevent any leakage of the fluid transferred in the rotating joint. Cavities 27a, 27b and 27c where the seals 24a, 24b and 24c are located are filled with the aid of an insulation fluid by means of two conduits 28a and 28b: the said insulation fluid is placed under a pressure $P_1$ greater than that of the transferred fluid to be sealed, thus ensuring a better contact between the seal and the two contact surfaces of the cavity. This is to prevent any escape of the transferred fluid. Nevertheless, for safety reasons, the insulation fluid is chosen to be compatible with the fluid to be sealed so that should a leak of transferred fluid occur, the insulation fluid would not pollute the transferred fluid. In the example proposed, three seals are arranged on each side of the toroidal chamber as follows: the main seal 24b and the secondary seal 24c are facing in the direction of the toroidal chamber, whereas the insulation seal 24a is facing in the opposite direction. The cavities that accommodate the main 24b and insulation 24a seals are filled with insulation fluid. Should a seal fault occur such as, by way of a non-limiting example, a leakage of insulation fluid, the secondary seal 24c would allow the seal to function until a repair was made.

Although these two embodiments have been widely used for a certain number of years, they have a certain number of drawbacks that have serious consequences for the seal.

Firstly, the 3-race roller bearing poses a few problems. As a reminder, the 3-race roller is used to keep the male and female members concentric. When a pressure is applied, the male and female members deform: the radial clearance within the bearing increases considerably. When external loads, coming from the conduits for example, act on the female member, all of the increases in clearance accumulate on one side of the female member. Radial deformations will therefore be present, resulting in a marked radial creep due to internal pressure. Consequently, the male and female members cannot be kept concentric, which requires a variation in the dimensions of the seal cavity.

In the two embodiments of rotating joints, each seal is placed in a cavity located in the female member and rotates on a surface of the male member. Sealing is thus created on two contact surfaces, one surface on each male or female member, respectively. This type of configuration creates the following stresses on the heel of the said seal:
 a circumferential tension, due to the deformation of the rotating joint under pressure;
 a tension or compression of the heel in a radial direction, due to the variation in size of the cavity;
 in the context of double lip seals, the friction of the first lip on the female member and the friction of the second lip on the male member create circumferential shearing due to oscillating movements. Similarly, the same shearing effect can occur on a toroidal-swivel joint.

The addition of all of these stresses can cause irreversible damage to the seal, which, over time, can result in the rupture or failure of the seal.

SUMMARY

This invention resolves all or some of the drawbacks raised by known solutions.

Among the many advantages of a rotating joint according to the invention, we can mention that it:
 reduces the costs and time spent to design rotating joints;
 simplifies the manufacture of rotating joints;
 improves the sealing systems within the rotating joint and consequently ensures more reliable fluid transfer;
 reduces the stresses of shearing or rotational torque exerted by known assemblies of rotating joints and thus lengthens the life of the seals used in rotating joints;
 adjusts the pressure within the rotating joint to suit requirements depending on the fluids involved;
 lengthens the life of rotating joints whatever the transferred fluid.

To this end, in particular, a rotating joint to transfer a first fluid is provided that comprises:
 a male member and a female member mounted movably in relation to each other;
 a mechanical bearing to keep the male and female members concentric;
 an annular seal;
 the female member being a substantially hollow cylindrical element whose internal wall comprises a first annular cavity opening onto the entire circumference of the internal wall of the said female member, the said first cavity being arranged to accommodate the seal.

After fitting the seal into the first cavity, in order to reduce the shearing stress on the seal and optimize the service life of the seals and consequently the rotating joints, the seal has an upper contact surface and a lower contact surface with the said first cavity, the said contact surfaces being substantially normal to the axis of revolution and cooperating solely with the first cavity.

Advantageously, in order to ensure sealing and prevent propagation of the first fluid outside the rotating joint in the event of a faulty seal, the rotating joint may also comprise means to convey a second fluid under pressure, at a pressure $P_2$ greater than $P_1$ of the first transferred fluid, to the said first cavity.

Preferably, the means to convey the second fluid may consist in one or more radial conduits in the female member opening into the first cavity.

So as not to pollute the first transferred fluid in the event of a leak from the seal, the second fluid can be compatible with the first fluid.

According to a preferred embodiment, the seal can be an O-ring.

As a variation, according to another preferred embodiment, the seal of a rotating joint according to the invention can have a U section and comprise two flexible lower and upper lips cooperating with a heel, the said lower and upper lips of the seal projecting in a plane normal to the axis of revolution of the said seal and constituting the lower and upper contact surfaces of the seal.

Furthermore, in order to reduce shearing stress and ensure the most reliable sealing possible, the depth of the first cavity is greater than or equal to the distance defined between the internal diameter and the external diameter of the seal.

As a variation or in addition, the rotating joint may also comprise a second cavity that is coaxial and contained in a substantially parallel plane not confused with that of the first cavity.

Advantageously, in order to ensure sealing and prevent the propagation of the first fluid outside the rotating joint in the event of a faulty seal, the rotating joint may comprise means to convey a third pressurized fluid at a pressure $P_3$ to the second cavity.

Preferably, the means for conveying the third fluid may consist in one or more radial conduits in the female member opening into the second cavity.

To guarantee a transfer of fluid, the male and female member of the rotating joint may be mutually arranged in order to form a toroidal chamber in which the first fluid passes at a pressure $P_1$, said first cavity being located between the toroidal chamber and the second cavity.

Advantageously, in order to seal high pressures by using joints designed for lower pressures and thus reduce the problems of extrusion relating to seals, the rotating joint may comprise an additional radial conduit located between the first and second cavities opening into the internal wall of the female member to convey a fourth fluid at a pressure $P_i$, so that the pressure $P_2$ of the second fluid is equal to the pressure of the chamber $P_1$ increased by a strictly positive determined pressure differential and the pressure $P_3$ of the third fluid is equal to the pressure $P_i$ of the fourth fluid increased by the same strictly positive determined pressure differential.

As a variation, the respective pressures $P_2$ and $P_3$ of the second and third fluids exceed the pressure of the first transferred fluid.

Preferably, in order to prevent the radial deformations inherent in a mechanical bearing, the mechanical bearing is a crossed roller bearing.

According to a second aim, the invention relates to a fluid transfer system (also known as a swivel stack system), comprising one or more rotating joints. In order to optimize the transfer of fluid safely and reliably, the said fluid transfer system comprises at least one rotating joint according to the invention.

BRIEF DESCRIPTION OF THE DRAWINGS

Further features and advantages will emerge more clearly from the following description and from an examination of the accompanying figures in which.

DETAILED DESCRIPTION

Figure 1:
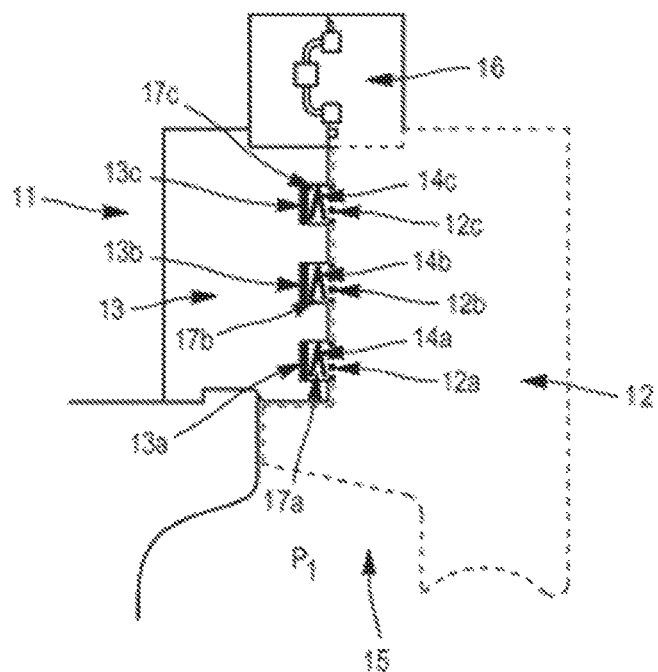
FIG. 1, previously described, shows a detailed view of a first known embodiment of a piston seal toroidal swivel joint.
Figure 2:
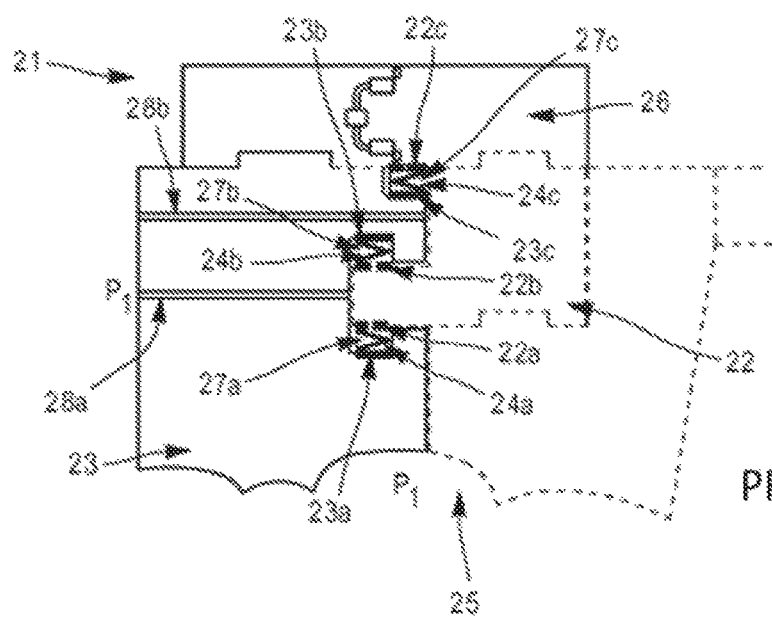
FIG. 2, previously described, is a graphic representation of a second known embodiment of a face seal toroidal swivel joint.
Figure 3A:
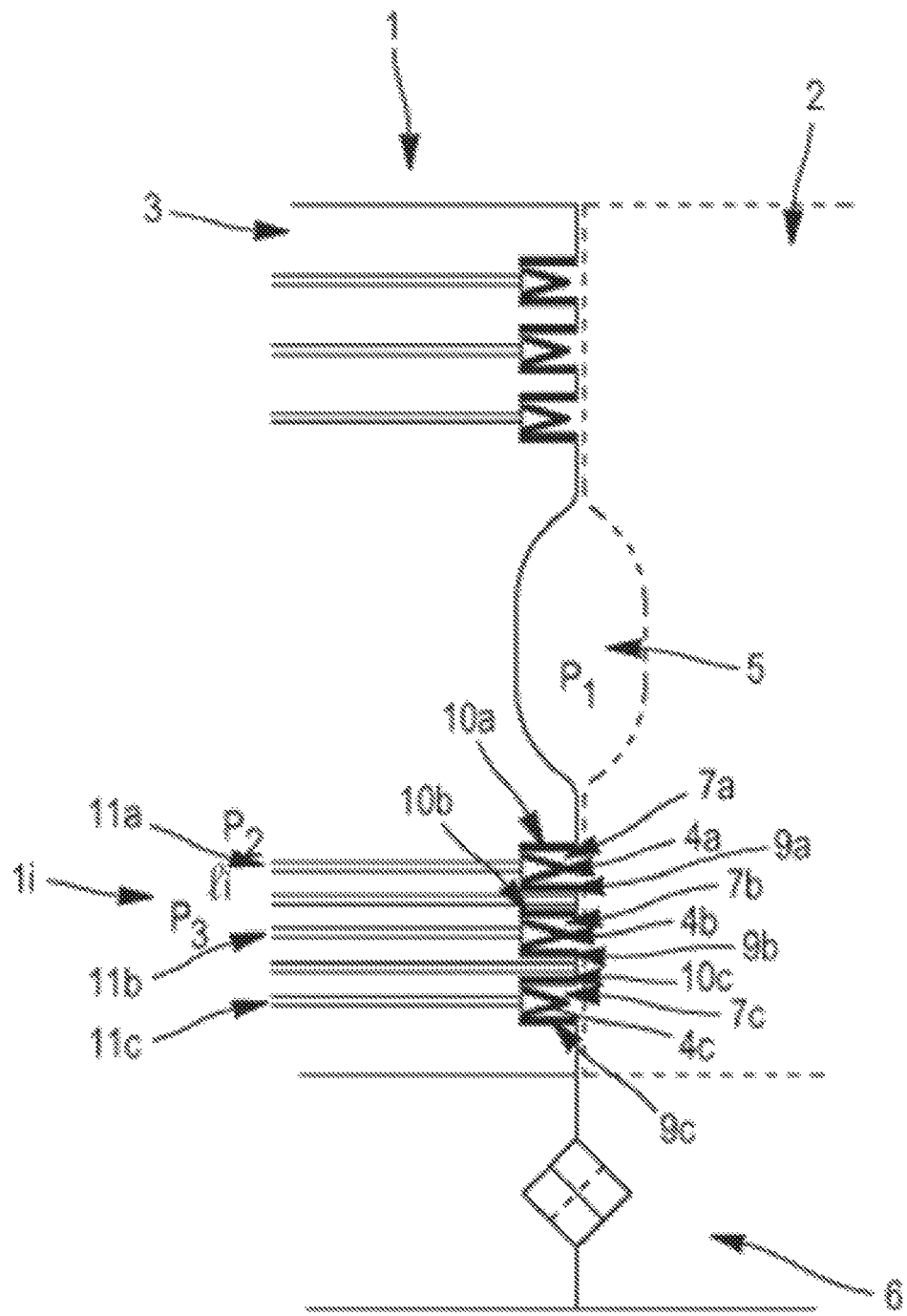
FIGS. 3a and 3b represent two cross-sectional views of a rotating joint 1 according to the invention.
Figure 3B:
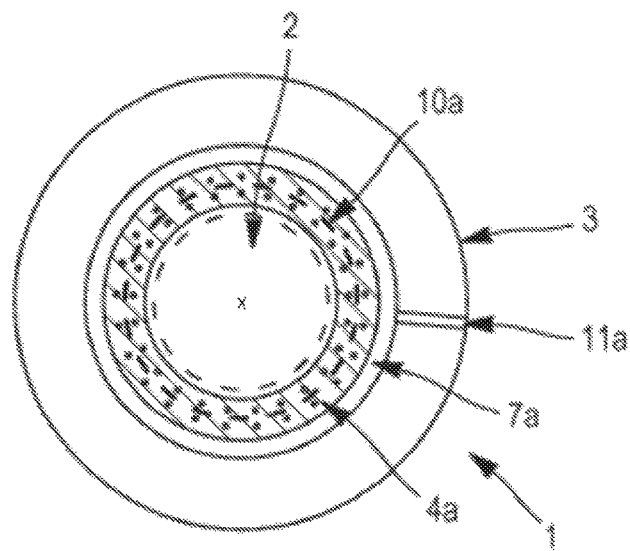

FIGS. 3a and 3b represent two cross-sectional views of a rotating joint 1 according to the invention.

A rotating joint 1 according to the invention is a toroidal swivel joint having an axis of revolution denoted X on FIG. 3b. This joint 1 comprises two members, one an internal male member 2 and the other an external female member 3, movable in relation to each other. A mechanical bearing 6 is present in the rotating joint to keep the male 2 and female 3 members concentric and ensure a minimum mechanical clearance. Advantageously, the mechanical bearing 6 can be a crossed roller bearing. Thanks to the "X" arrangement of the rolling elements, crossed roller bearings are suitable for applications with radial loads, axial loads in both directions, tilting moments or all combinations of loads. These bearings are also characterized by high precision, high rigidity, minimum size and easy installation. A crossed roller bearing is composed of two sets of rings and rollers mounted perpendicularly to each other and alternately in one direction or another. Once assembled, this double-row bearing has a total height slightly above that of a single-row bearing. Using a crossed roller bearing instead of a bearing with three rows of bearings advantageously allows the male 2 and female 3 bearings to be kept concentric, whatever the radial deformations sustained by the members.

The role of a rotating joint is to ensure the transfer of a fluid. Consequently, it must have one or more elements performing a sealing function, in other words an element that prevents the passage of a fluid from a first enclosure to a second neighboring enclosure. The sealing guaranteed is dynamic sealing since the male 2 and female 3 members rotate relative to each other. A rotating joint 1 according to the invention comprises one or more annular seals 4a, 4b and 4c that can be adapted to the dimensions required by the rotating joint 1. The seals 4a, 4b and 4c are mounted in the rotating joint 1 within annular cavities 7a, 7b and 7c made in the female member 3. The said cavities 7a, 7b and 7c are advantageously obtained by molding or machining and open out around the entire circumference of the internal wall of the said female member 3, thus forming grooves. Furthermore, they are coaxial and aligned along substantially parallel distinct planes. Each cavity 7a, 7b and 7c accommodates one seal 4a, 4b and 4c. The cavities can have different shapes: they can be adapted to the shape of the seal and have substantially C-shaped semi-circular sections or ⊓-shaped angular sections. A C-shaped cavity is particularly advantageous to house an O-ring; a ⊓-shaped cavity is more suitable for a lip seal. In practice, ⊓-shaped cavities are difficult to machine: advantageously, ∩-shaped cavities are particularly suitable for lip seals and are to be preferred.

Advantageously, seal or seals 4a, 4b or 4c may be O-rings. O-rings are considered to be particularly suitable for their applications in rotating joints because they ensure sealing over a wide pressure, temperature and tolerance range. They are effective and cheap sealing elements that enable a wide range of static or dynamic applications because their small size ensures small assemblies and their easy installation reduces risks and increases their reliability, while the large choice of manufacturing materials that they offer allows compatibility with most fluids. Compatibility means any material that is chemically inert with most fluids, being capable of guaranteeing complete absence of chemical reaction between the material and the fluid to be sealed, regardless of changes in temperature and pressure. By way of a non-limiting example, the constituent material of the O-ring or O-rings can be "nitrile" rubber, silicone, a polyurethane or a fluoroelastomer. One of the limits of this type of seal is that they cannot be used at very high speeds. Furthermore, advantageously, the seal or seals 4a, 4b and 4c can have their internal diameters corresponding to the external diameter of the male member.

As a variation or in addition, the seal or seals 4a, 4b and 4c can be flexible lip seals. U-shaped seals combining one or more types of materials are used: the most widely used materials are synthetic elastomers, by way of non-limiting examples, nitrile (butadiene acrylo-nitrile), a fluorocarbon elastomer such as polytetrafluoroethylene (hereinafter PTFE), polyacrylates or silicones. Such a seal usually consists of at least two flexible lips cooperating with a heel to form a single entity, the said heel enabling the lips to be held with the rest of the seal. In order to ensure more reliable sealing, depending on the material used, the seal can advantageously comprise a spring, preferably flat, to create the radial force at the two lips necessary to ensure sealing. Usually, seals are made of PTFE loaded with additives in order to increase their resistance to wear and extrusion. Nevertheless, PTFE has a tendency to creep over time under pressure, in other words after a certain time in the same position under the application of a certain pressure, the heel of the seal will have the dimensions of the cavity and the material will consequently be extruded. In order to work under high pressure, as is the case in rotating joints, an anti-extrusion ring made of a more resistant material such as polyetheretherketone (PEEK) or polyamide-imide (PAI) can be added to the heel to prevent this extrusion phenomenon.

Furthermore, dynamic sealing is ensured by the single cooperation, consequently the contact, of the annular seal or seals around the entire circumference of the rotating joint 1 according to the invention, with the aid of an upper contact surface 10a, 10b and 10c and a lower contact surface 9a, 9b and 9c of the seal or seals 4a, 4b and 4c and the internal wall of the cavity or cavities contained in the rotating female member 3. The upper 10a, 10b and 10c and lower 9a, 9b and 9c contact surfaces are advantageously normal to the plane of revolution of the rotating joint 1 to marry up with the shape of the cavity or cavities 7a, 7b and 7c. Thus, the favored contact surfaces of the seal or seals 4a, 4b and 4c rotate in the cavity or cavities 7a, 7b and 7c within a single rotating member, the female member 3, which allows the shearing stresses to be eliminated in the seal, and more particularly in the heel of the seal when lip seals are used.

A rotating seal 1 according to the invention is used to ensure the transfer of fluid at a certain pressure in a totally sealed, safe and reliable manner in the seawaters. The transfer of such a fluid is performed through a toroidal chamber 5, formed thanks to the mutual arrangement of the male 2 and female 3 members, movable in relation to each other. This first fluid at a pressure $P_1$ can advantageously be oil and/or other gases such as, by way of a non-limiting example, hydrocarbons. Sealing is ensured by the presence of seals 4a, 4b and 4c inside the rotating joint 1. Nevertheless, these rotating joints are not "foolproof": the rotational movement of the two members whose clearance is to be sealed and in particular the speed applied and the use of fluid under high pressures merely accelerate the wear and extrusion of said seals, possibly resulting in leaks of the first fluid into the seawaters. In order to overcome these drawbacks, the rotating joint 1 according to the invention can comprise means for applying a pressure on the seals. This pressure enables a compressive stress to be applied on the seal and more particularly, in the case of lip seals with an anti-extrusion ring, on the heel and on the anti-extrusion ring. Compressive stress reduces the risk of cracks, optimizes the stress causing wear of the material during the seal's lifetime and consequently maintains the rigidity of the seal on the fixed male member 2. These means for applying a pressure are based on an oil barrier system. This system follows the following principle, described above: an oil barrier is created artificially for one or more seals in order to prevent any leakage of the fluid transferred in the rotating joint 1. For each cavity 7a, 7b and 7c, a fluid is conveyed to the cavity by one or more radial conduits 11a, 11b and 11c present in the female member and opening into the cavity 7a, 7b and 7c.

By way of a non-limiting example, for the first cavity 7a, a second fluid, usually called "insulation fluid," can be conveyed via a radial conduit 11a into the female member opening into the internal wall of the cavity 7a. In addition, other radial conduits can open into the first cavity 7a. The said second fluid is brought to a pressure $P_2$ higher than $P_1$ of the first transferred fluid, thus ensuring a better contact between the two upper 10a and lower 9a contact surfaces of the seal 4a and the internal wall of the cavity 7a. This is to prevent any leakage of the first transferred fluid. Nevertheless, for safety's sake, the second fluid is chosen so that it is compatible with the fluid to be sealed, because if a leak of the first transferred fluid were to occur, the second fluid would not pollute the first transferred fluid. Compatible means any fluid that is chemically inert with the transferred fluid, meaning that any compatible fluid must be capable of guaranteeing total absence of chemical reaction between the first and second fluids, despite changes in temperature and pressure. By way of a non-limiting example, when the first fluid is oil, the second fluid, in order to ensure pressurization, can be a hydraulic oil, glycol or even methanol. Furthermore, the pressurization of the said second fluid at pressure $P_2$ is assured by an external element, a hydraulic power pack, which exerts a pressure on the insulation fluid in the form of a pump based on the principle of Pascal's Law. The pressure $P_2$ of the second fluid has been defined as being greater than pressure $P_1$ of the first fluid; thus, the pressure $P_2$ of the second fluid is equal to the pressure $P_1$ of the first fluid plus a strictly positive determined pressure differential. Said pressure differential can advantageously correspond to a percentage equivalent to a value ranging between five and ten percent of pressure $P_1$ of the first transferred fluid. The rotating joint 1 according to the invention can also comprise measurement means in order to check that the pressure $P_2$ of the second fluid is kept higher than pressure $P_1$ of the transferred fluid. In addition or as a variation, the said rotating joint 1 can also comprise means for the servo-control of the insulation fluid in order to achieve a fixed overpressure or underpressure depending on the value of the pressure $P_1$ of the first transported fluid.

Similarly, in order to ensure sealing of the secondary seal 4b, for the second cavity 7b, a third fluid, also commonly known as "insulation fluid," can be conveyed via a radial conduit 11b into the female member opening into the internal wall of the cavity 7b. As previously described, the pressure $P_3$ of the third fluid can be higher than the pressure $P_1$ of the first fluid; thus, the pressure $P_3$ of the third fluid is equal to the pressure $P_1$ of the first fluid increased by a strictly positive determined pressure differential. Said pressure differential can correspond to a percentage equivalent to a value ranging between five and ten percent of the pressure $P_1$ of the first transferred fluid. Said second and third fluids can consist in a same insulation fluid. Nevertheless, pressures $P_2$ and $P_3$ of the second and third fluids, possibly different, will be determined as strictly higher than pressure $P_1$ of the transferred fluid.

As a variation, in order to enable the fluids subject to high pressures to be sealed while using joints designed for lower pressures and thus optimize the system from an economic point of view, for example by reducing the manufacturing costs of the rotating joint, a succession of joints pressurized at lower pressures as you move away from the toroidal chamber can be envisaged. These pressures are obtained by the application of a fourth fluid, commonly called "counterfluid." The female member 3 of the rotating joint 1 can comprise an additional radial conduit 11$i$ opening onto the internal wall of the female member 3. Said radial conduit 11$i$ is located between the first and second cavities 11$a$ and 11$b$ enabling the fourth fluid to be conveyed. The second, third and fourth fluids can advantageously be the same fluid subject to different pressures $P_2$, $P_3$ and $P_i$ thus forming a pressure gradient. Preferably, the different pressures $P_2$, $P_3$ and $P_i$ can advantageously be obtained by using different hydraulic power packs ensuring the pressurization of the fluid at the desired pressures. The pressure gradient can advantageously be defined as described below:

applied to the first cavity 7$a$, as described above, the pressure $P_2$ of the second fluid is equal to the pressure of the chamber $P_1$, corresponding to the pressure of the first transferred fluid, increased by a strictly positive determined pressure differential;

applied to the internal wall, the pressure $P_i$ of the fourth fluid is equal to a predetermined pressure below pressure $P_1$ resulting in the chamber;

applied to the second cavity 7$b$, the pressure $P_3$ of the third fluid is equal to the pressure $P_i$ of the fourth fluid increased by a strictly positive determined pressure differential.

The said pressure differential corresponds to a percentage equivalent to a value ranging between five and ten percent of the pressure $P_1$ of the first strictly positive transferred fluid.

The predetermined pressure $P_i$ also depends on the characteristics of the seal used in the cavity, not anymore on the pressure $P_1$ of the transferred first fluid. In fact, depending on the type of seals and according to the type of material that they comprise, these seals withstand high pressures more or less well: extrusion and creep can appear more or less rapidly; consequently, alternatives must be found in order to avoid certain maintenance and repair costs should the seals fail. Reducing the pressure in the seals slows down extrusion phenomena of the seals and thus extends their service life. According to this variation, the total cost of the rotating joint 1 according to the invention is therefore less than that of existing rotating joints available on today's market.

Furthermore, an additional radial conduit (not shown in the figures) can advantageously be arranged in the lower part of the female member 3 to recover additional leaks of the first fluid that might not have been sealed off by the system.

Similarly, it could be envisaged to add a plurality of cavities each cooperating with one seal if need be. Generally, the last seal 4$c$ is used as a safeguard or emergency system since it is a redundant seal with respect to seal 4$b$: it will only be pressurized and used as a secondary seal if one of the other seals fails to provide perfect sealing.

Figure 4:
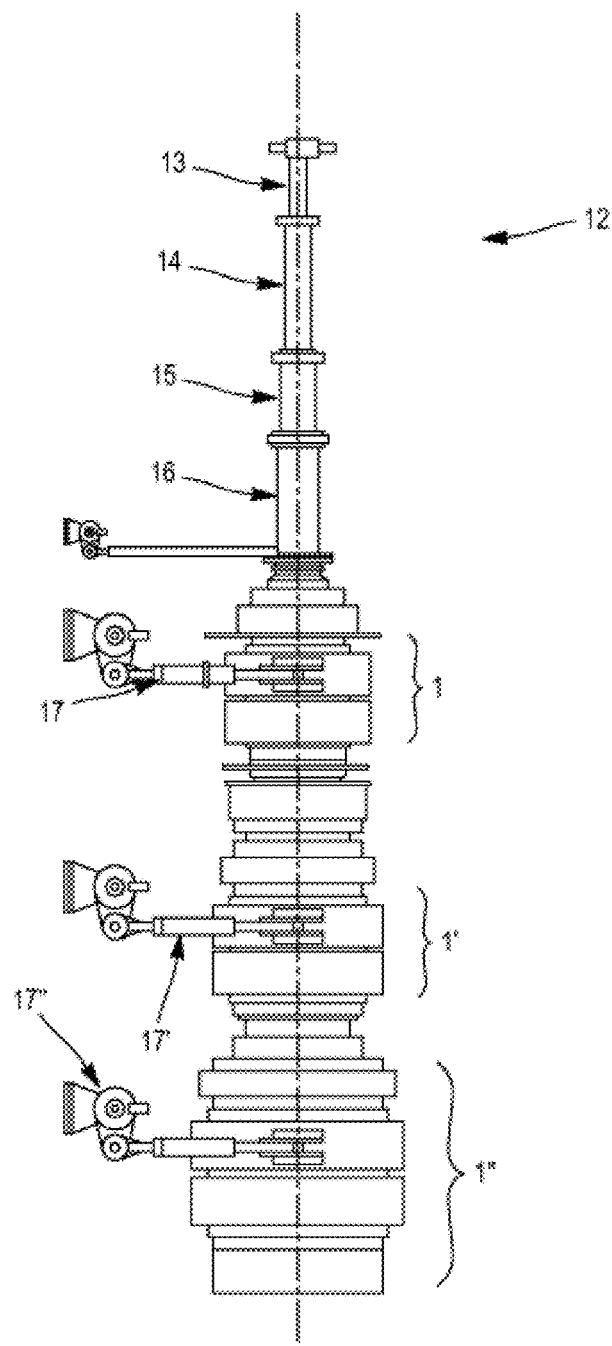
FIG. 4 shows a variation of application of the rotating joint 1 according to the invention in its use within a fluid transfer system.

FIG. 4 shows a variation of application of the rotating joint 1 according to the invention in its use within a fluid transfer system 12. The transfer system (also known as a swivel stack) consists of an assembly of rotating joints 1, 1' and 1" according to the invention. Other modules of rotating joints can be used to enable other transfers. By way of non-limiting examples, there are in particular:

an optical swivel 13 and an electric swivel 14 that enable transfers of power and information;

other rotating joints 15 and 16, known as utility swivel joints, enabling the transfer of all of the products and additives required for the transfer and proper operation of the transfer system, such as chemical agents, hydraulic agents, air or other gas, and firefighting or discharge water;

torque arms 17, 17' and 17" assist the fluid transfer system 12 and ensure that rotating joints 1, 1' and 1" are supported.

The transfer system 12 according to the invention cannot be limited solely to the modules described. Any module suitable for the transfer of a fluid comprising a rotating joint according to the invention whose reservoir is immersed in the sea could be envisaged.

Transfer systems 12 are usually incorporated within offshore rotating mooring systems such as, by way of a non-limiting example, within a floating production, storage and offloading unit. These units are usually in the form of a ship cooperating with a drilling rig and at least one fluid transfer system, the said system possibly being included within a mooring turret, a rotating system allowing the ship to position itself freely so as to offer less resistance to sea currents. Advantageously, the floating unit comprises a fluid transfer system according to the invention.

Other modifications can be envisaged without departing from the scope of the present invention defined by the accompanying claims.

The invention claimed is:

1. Rotating joint for transferring a first fluid comprising:
a male member and a female member mounted movably in relation to each other, the female member being a substantially hollow cylindrical element whose internal wall comprises a first annular cavity and a second cavity opening thereon, the second cavity being coaxial and contained in a substantially parallel plane distinct from that of the first cavity;
a mechanical bearing to keep the male and female members concentric;
an annular seal fitting into the first cavity, the seal having an upper contact surface and a lower contact surface with the first cavity, the contact surfaces being substantially normal to an axis of revolution of the rotating joint and cooperating solely with the first cavity, the male and female members being mutually arranged in order to form a toroidal chamber in which a first fluid passes at a pressure $P_1$, the first cavity being located between the toroidal chamber and the second cavity;
means for conveying a second pressurized fluid at a pressure $P_2$ to the first cavity;
means for conveying a third pressurized fluid at a pressure $P_3$ to the second cavity; and
a radial conduit located between the first and second cavities opening into the internal wall of the female member to convey a fourth fluid at a pressure $P_i$, so that the pressure $P_2$ of the second fluid is equal to the pressure $P_1$ of the chamber increased by a strictly positive determined pressure differential and the pressure $P_3$ of the third fluid is equal to the pressure $P_i$ of the fourth fluid increased by the same strictly positive determined pressure differential.

2. Rotating joint according to claim 1, wherein the means for conveying the second fluid comprises one or more additional radial conduits in the female member opening into the first cavity.

3. Rotating joint according to claim 1, wherein the means for conveying the third fluid comprises one or more additional radial conduits in the female member opening into the second cavity.

4. Fluid transfer system, comprising one or more rotating joints, according to claim 1.

* * * * *